Nov. 27, 1956  C. B. LEACH  2,771,869
GASKET
Filed Sept. 29, 1954
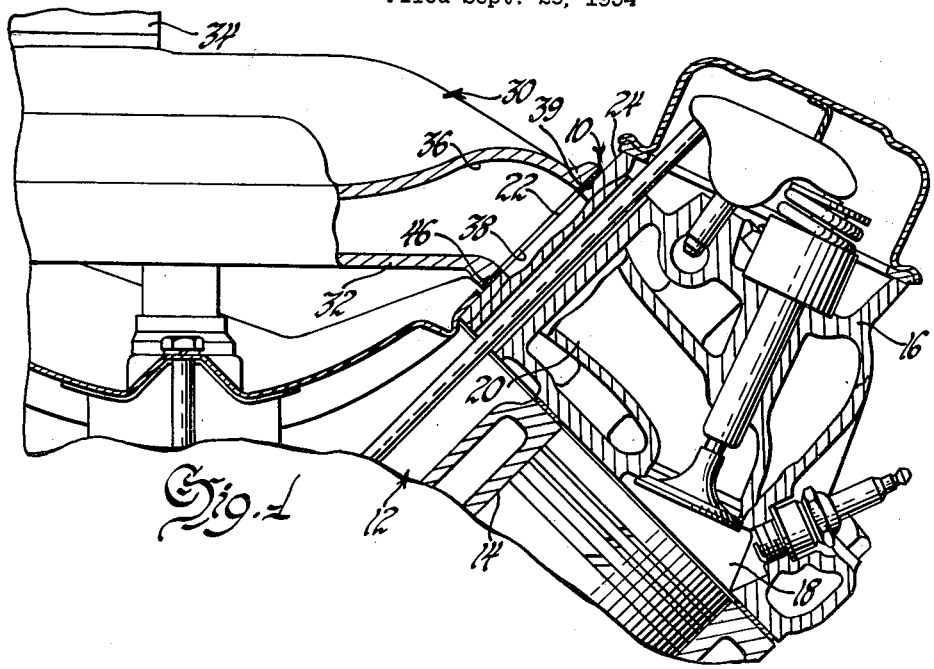
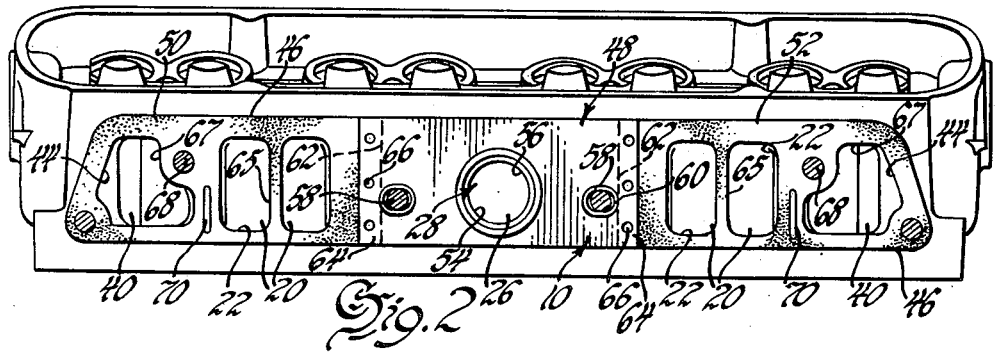
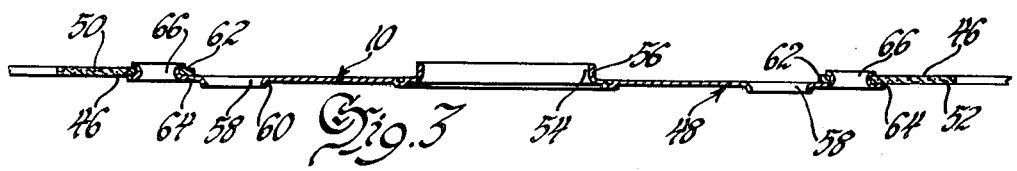
INVENTOR
Clayton B. Leach
BY
L. D. Burch
ATTORNEY United States Patent Office 2,771,869
Patented Nov. 27, 1956

2,771,869

GASKET

Clayton B. Leach, Pontiac, Mich., assignor to General Motors Corporation, Detroit, Mich., a corporation of Delaware Application September 29, 1954, Serial No. 459,136

9 Claims. (Cl. 123—193)

The present invention relates to internal combustion engines and more particularly to gaskets therefor.

At the present time it is the practice to employ gaskets between the mating parts of an engine for preventing the loss of fluids by leakage through the junctions between the parts. The gaskets providing the most effective and economical sealing are made of an easily compressible material such as a treated paper or cork composition. Although this material can provide a very effective sealing action, it is usually unable to withstand the high temperatures and pressures that are developed in some portions of an internal combustion engine such as those portions that are subjected to exhaust gases. Accordingly, in the past, when a portion of a gasket was subjected to a high temperature, the entire gasket was fabricated out of metal or some other expensive material capable of withstanding the high temperatures. Although such a material may adequately seal the exhaust gases, it may not be able to seal a liquid having a low surface tension such as an engine coolant that is a mixture of water and some of the so-called "anti-freezes." Thus even the portions of the gasket that were not subjected to the higher temperatures were made from the more expensive material which frequently was unable to adequately seal the coolant.

It is now proposed to employ an inexpensive composite gasket for use in locations where a limited portion of the gasket is subjected to high temperatures and/or pressures while the remaining portion of the gasket is subjected to more moderate temperatures. Although the gasket may be employed in numerous locations, the present gasket is particularly adapted for use between the intake manifold and the cylinder head of a so-called "V-type" engine wherein the gasket seals the junction between the exhaust passages as well as junctions for the passages in the induction system and the cooling system. The gasket may include a metallic portion and one or more readily compressible portions. The metal portion may be positioned to seal the junctions that are subjected to very hot fluids such as exhaust gases while the readily compressible portions may be positioned to seal the junctions which are subjected to cooler substances such as in the passages for the induction system and cooling system.

In the drawings:

Fig. 1 is a cross sectional view of an engine employing a gasket embodying the present invention.

Fig. 2 is a side view of the cylinder head of the engine in Fig. 1 with the gasket in position thereon.

Fig. 3 is a cross sectional view of the gasket.

Referring to the drawings in more detail the present invention may be embodied in a gasket 10 for installation on any suitable engine 12. In the present instance the engine 12 is of the so-called "V-type" having a pair of angularly disposed banks of cylinders 14 with cylinder heads 16 secured thereto for closing the upper ends of the cylinders 14 and forming combustion chambers 18. Intake passages 20 may extend through the heads 16 to communicate with the combustion chambers 18 and form induction ports 22 on the faces 24 on the insides of the heads 16. Exhaust passages 26 may also be provided that extend through the heads 16 and communicate with the combustion chambers 18 and the exhaust manifolds on the outsides of the heads 16. At least one exhaust passage 26 in each head may extend completely therethrough to form exhaust ports 28 in the centers of the faces 24 on the heads 16 between the induction ports 22.

An induction system 30 which may be disposed in the space between the banks of cylinders 14 may include an intake manifold 32 and a carburetor 34 that is mounted on the manifold 32. This manifold 32 may have the opposite sides thereof positioned to abut against the faces 24 of the cylinder heads 16. One or more distribution passages 36 may extend through the manifold 32 and form induction ports 38 on the opposite faces of the manifold 32 positioned to register with the induction ports 22 in the cylinder heads 16.

The manifold 32 may also include one or more coolant passages that will form ports on the ends of the manifold 32. These ports may be positioned outboard of the induction ports 38 and to register with the ports 44 in the heads 16 communicating with the coolant jacket.

An exhaust crossover passage may extend completely through the manifold 32 with at least a portion thereof being in heat exchanging relation with the walls of the distribution passages 36. The opposite ends of this passage may form exhaust ports that register with the exhaust ports in the faces 24 of heads 16. Thus the combustible charge developed by the carburetor 34 may flow from the distribution passages through the registering induction ports 22 and 38 into the intake passages. Also if desired, the exhaust gases may flow from the exhaust passages 26 in the head 16 through the exhaust ports into the crossover passage in the manifold 32 to thereby heat the combustible charge flowing through the distribution passages.

Gaskets 46 may be provided between the abutting faces 24 and 39 on the cylinder heads 16 and the intake manifold 32 in order to prevent the leakage of the exhaust gases, the combustion charge and/or the coolant from between the head 16 and the manifold 32. In the present instance this gasket 46 is an elongated composite structure that includes a center portion 48 and two end portions 50 and 52 that are secured to the opposite ends of the center portion 48.

The center portion 48 of the gasket 46 may comprise a member fabricated out of metal or some other material suitable for withstanding high temperatures. A central opening 54 may be provided through the center of this portion 48 to register with the exhaust ports formed in the heads 16 and the manifold 32. A flange 56 normal to the gasket 46 may extend around the opening 54 to project into the exhaust passage in the head 16 for insuring the proper positioning of the gasket 46 and/or to insure a streamlined junction of the exhaust passages thereby minimizing the impedance to the flow of exhaust gases. In addition to providing such a flange 56, one or more elongated openings 58 having raised flanges 60 may be provided to extend into openings in the manifold 32 thereby insuring the manifold being properly positioned on the heads.

The end portions 50 and 52 of the gasket 46 may be secured to the ends of the center portion 48 so as to project in opposite directions therefrom. These portions 50 and 52 are preferably made of a material such as treated paper or a cork composition that is well adapted for sealing fluids having a low surface tension.

Each of the end portions 50 and 52 may have a segment 62 thereof overlapping a segment 64 of the center portion 48. The metal in the center portion 48 may then be upset at one or more points 66 to extend through openings in the end portions 50 and 52 and be crimped over. Thus the end portions 50 and 52 and the center portion 48 will be riveted together and thereby form a single integral assembly.

These end portions 50 and 52 of the gasket 46 are adapted to seal the intake passages and the cooling jacket passages and accordingly, they may include several elongated openings 65 and 67 that are positioned to register with the induction ports and the coolant openings formed in the heads 16 and manifolds 32. A plurality of bolt holes 68 may be provided in the gasket 46 so as to permit the manifold 32 to be securely fastened to the heads for compressing the gasket therebetween.

A leakage barrier 70 may be provided in each end portion 50 and 52 to extend transversely of the gasket 46 in the space between the coolant openings and the induction openings. If any coolant escapes from one of the cooling openings and flows towards the openings for the intake passage, it will first have to pass through the leakage barrier 70. Accordingly, the coolant will be prevented from flowing into the induction system as it will collect in the barrier 70 and possibly leak from one end thereof to the exterior of the engine.

It may therefore be seen that a unitary gasket is provided which is capable of simultaneously effectively sealing high temperature fluids and cooler low surface tension fluids.

While the embodiment of the present invention as herein disclosed constitutes a preferred form, it is to be understood that other forms might be adopted, all coming within the scope of the claims which follow.

What is claimed is:

1. A gasket adapted to be compressed between a pair of members having abutting surfaces thereon and passages extending therethrough to form ports in said surfaces, each of the ports in one surface being positioned to register with a corresponding port in the other surface so that the passages in one member will be individually joined with a corresponding passage in the other member so as to form separate sets of passages, said gasket including a first portion having an aperture therein positioned to register with the ports formed by one set of said passages, said portion consisting substantially entirely of one material which is particularly adapted for sealing the fluid in said set and a second portion having an aperture therein to register with the ports formed by another set of passages, said second portion consisting substantially entirely of a material which is particularly adapted for sealing the fluid in said other set of passages.

2. A gasket adapted to be compressed between a pair of members having abutting surfaces thereon and passages extending therethrough to form ports in said surfaces, each of the ports in one surface being positioned to register with a corresponding port in the other surface so that the passages in one member will be joined with a corresponding passage in the other member so as to form separate sets of passages, said gasket comprising a metallic portion having an aperture therein positioned to register with a first set of ports formed by a first set of passages, and at least one other portion secured to said metallic portion and consisting entirely of a more readily compressible material having apertures therethrough positioned to register with the ports formed by the other of said sets of passages.

3. The gasket of claim 2 wherein a centering flange projects from said metallic portion around said aperture to extend into one of the passages in said first set of passages in said members.

4. A gasket adapted to be compressed between abutting surfaces on a cylinder head member and an intake manifold member, each of said members including exhaust passages and induction and coolant passages which form exhaust ports, induction ports and coolant ports, respectively, in the abutting surfaces on said members, said gasket comprising a portion consisting entirely of a metallic material and having an aperture therethrough positioned to register with said exhaust ports and at least one second portion consisting entirely of a more readily compressible material having apertures positioned therein to register with said induction and coolant ports, said second portions having an end thereof overlapping an end of said metallic portion with said metallic portion having a plurality of parts thereof riveted onto said second portion.

5. An engine comprising a cylinder head; an intake manifold secured to said cylinder head with a side thereof abutting a side of said head; exhaust passages, induction passages and coolant passages disposed in said head and manifold to form respectively, registering exhaust ports, induction ports and coolant ports in said abutting sides of said head and manifold, a gasket compressed between said sides, said gasket including a portion consisting entirely of a metallic material and having an aperture disposed to register with said exhaust ports and a portion consisting substantially entirely of a more readily compressible material and having apertures therein positioned to register with said induction and coolant ports.

6. A gasket to be compressed between a pair of members having a plurality of sets of passages therein for sealing the ports formed at the junction between said passages, said gasket comprising a center portion extending the full width of said gasket and consisting entirely of a metallic material and having an aperture positioned to register with a port formed in one of said members by one of said passages, a pair of end portions extending the full width of said gasket and consisting entirely of a readily compressible gasket material, each of said end portions being secured to the opposite ends of said center portion so as to extend in the opposite directions therefrom, each of said end portions having apertures therein positioned to register with other ports formed by the other passages in said members.

7. A gasket to be compressed between a pair of members of an engine having exhaust passages and induction passages therein for sealing the ports at the junctions between said passages, said gasket comprising a center portion extending the full width of said gasket and consisting entirely of a metallic material and having an aperture therethrough positioned to register with said exhaust ports, a flange projecting from said center portion into said exhaust port for positioning said center portion, end portions secured to the opposite ends of said center portion, said end portions extending the full width of said gasket and consisting entirely of a readily compressible material having apertures therein positioned to register with said induction ports.

8. A gasket to be compressed between a pair of members of an engine having an exhaust passage and an induction passage therein for sealing the ports formed at the junctions between said passages in said members, said gasket comprising a center portion extending the full width of said gasket and consisting entirely of a metallic material and having an aperture therein positioned to register with said exhaust ports, and a pair of end portions extending the full width of said gasket and consisting of a more readily compressible material secured to the opposite ends of said center portion so as to project in the opposite directions therefrom, each of said end portions having apertures therein adapted to register with said induction ports in said engine, said metallic portion being riveted to said end portions.

9. A gasket to be compressed between a pair of members of an engine having exhaust passages and induction passages therein for sealing the ports at the junctions between said passages, said gasket comprising a center portion consisting entirely of a metallic material and having an aperture therein positioned to register with said exhaust ports in an engine, a flange projecting from said portion to extend into said exhaust port for positioning said gasket on said engine, a pair of end portions consisting of a more readily compressible material overlapping the ends of said center portion, said center portions being riveted to said end portions, said end portions having a plurality of apertures therein positioned to register with said induction ports.

References Cited in the file of this patent

UNITED STATES PATENTS

| | | |
|---|---|---|
| 1,626,110 | Bailey et al. | Apr. 26, 1927 |
| 1,768,995 | Oven | July 1, 1930 |
| 1,846,401 | Oven | Feb. 23, 1932 |
| 1,982,759 | Rosen | Dec. 4, 1934 |
| 2,679,241 | Dickson | May 25, 1954 |
| 2,681,241 | Aukers | June 15, 1954 |